United States Patent
Baba et al.

(10) Patent No.: US 9,712,640 B2
(45) Date of Patent: *Jul. 18, 2017

(54) LOAD DISTRIBUTION IN CLIENT SERVER SYSTEM

(71) Applicant: International Business Machines Corporation, Armonk, NY (US)

(72) Inventors: Masahiro Baba, Kawasaki (JP); Yoshinori Tahara, Yamato (JP); Takatoshi Watanabe, Fujisawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 288 days.

This patent is subject to a terminal disclaimer.

(21) Appl. No.: 14/509,399

(22) Filed: Oct. 8, 2014

(65) Prior Publication Data

US 2015/0032806 A1 Jan. 29, 2015

Related U.S. Application Data

(63) Continuation of application No. 12/097,759, filed as application No. PCT/JP2006/325831 on Dec. 26, 2006, now Pat. No. 8,924,467.

(30) Foreign Application Priority Data

Dec. 28, 2005 (JP) ................................. 2005-377421

(51) Int. Cl.
*G06F 15/16* (2006.01)
*H04L 29/08* (2006.01)
(Continued)

(52) U.S. Cl.
CPC .............. *H04L 67/32* (2013.01); *G06F 9/505* (2013.01); *H04L 67/1002* (2013.01);
(Continued)

(58) Field of Classification Search
CPC ........................ H04L 67/1008; H04L 67/1029
(Continued)

(56) References Cited

U.S. PATENT DOCUMENTS 5,923,875 A 7/1999 Tabuchi
5,930,511 A 7/1999 Hinsley
(Continued)

FOREIGN PATENT DOCUMENTS

CN 1469243 A 1/2004
CN 101346696 A 1/2009
(Continued)

OTHER PUBLICATIONS

Dynamic Loahiroyuki, S. et al., "Dynamic Load Balancing Method in Consideration of History for the Distributed Systems," Kenkyu Hokoku of Information, Processing Society of Japan, vol. 95, No. 119, pp. 31-36.
(Continued)

*Primary Examiner* — Imad Hussain
(74) *Attorney, Agent, or Firm* — Cuenot, Forsythe & Kim, LLC

(57) ABSTRACT

A server distributes operations between the server and a plurality of clients connected to the server. The server includes a communication unit and a delegation processor. The communication unit is configured to receive information indicating a status of a requesting client together with a connection request by the requesting client to the server. The delegation processor is configured to determine a delegation level characterizing a capability of the requesting client to perform at least one operation associated with the connection request and otherwise performed by the server. The delegation processor is also configured to, upon a load status of the server exceeding a predetermined allowable load,
(Continued)

notify the requesting client to perform processing of a specified operation associated with the connection request.

15 Claims, 7 Drawing Sheets

(51) Int. Cl.
  *G06F 9/50* (2006.01)
  *H04L 29/06* (2006.01)

(52) U.S. Cl.
  CPC ...... *H04L 67/1008* (2013.01); *H04L 67/1012* (2013.01); *H04L 67/1029* (2013.01); *H04L 67/42* (2013.01); *G06F 2209/508* (2013.01); *G06F 2209/509* (2013.01); *G06F 2209/5016* (2013.01)

(58) Field of Classification Search
  USPC ........................................................ 709/203
  See application file for complete search history.

(56) References Cited

U.S. PATENT DOCUMENTS

| | | | |
|---|---|---|---|
| 6,385,636 B1 | 5/2002 | Suzuki | |
| 6,393,458 B1 | 5/2002 | Gigliotti et al. | |
| 6,725,253 B1 | 4/2004 | Okano et al. | |
| 6,779,017 B1 | 8/2004 | Lamberton et al. | |
| 6,862,103 B1 | 3/2005 | Miura et al. | |
| 6,963,897 B1 | 11/2005 | Hubbard | |
| 6,965,930 B1 | 11/2005 | Arrowood et al. | |
| 7,092,985 B2 | 8/2006 | Hubbard | |
| 7,593,987 B2* | 9/2009 | Salesky | G06F 3/1415 709/203 |
| 7,610,425 B2 | 10/2009 | Solomita et al. | |
| 7,660,829 B2* | 2/2010 | Steere | G06F 17/30067 707/812 |
| 7,827,595 B2* | 11/2010 | Gociman | G06F 21/6218 709/203 |
| 2003/0097370 A1 | 5/2003 | Yamamoto | |
| 2003/0149741 A1* | 8/2003 | Krooss | H04L 67/40 709/217 |
| 2004/0003029 A1* | 1/2004 | Islam | G06F 9/505 709/203 |
| 2004/0230742 A1 | 11/2004 | Ikeuchi et al. | |
| 2005/0010664 A1 | 1/2005 | Hubbard | |
| 2005/0027862 A1* | 2/2005 | Nguyen | G06F 9/505 709/225 |
| 2005/0144234 A1 | 6/2005 | Tanaka et al. | |
| 2006/0106938 A1* | 5/2006 | Dini | G06F 11/008 709/228 |
| 2006/0253457 A1 | 11/2006 | Takahashi et al. | |
| 2007/0006285 A1* | 1/2007 | Stafie | H04L 63/08 726/4 |
| 2007/0078858 A1* | 4/2007 | Taylor | G06F 9/5083 |
| 2007/0083597 A1 | 4/2007 | Salesky et al. | |
| 2008/0273676 A1 | 11/2008 | Cafarella et al. | |
| 2009/0006541 A1 | 1/2009 | Baba et al. | |
| 2009/0122706 A1 | 5/2009 | Alfano et al. | |
| 2009/0138551 A1 | 5/2009 | Hubbard | |

FOREIGN PATENT DOCUMENTS

| | | | |
|---|---|---|---|
| EP | 1973037 | B1 | 8/2012 |
| GB | 2272085 | A | 4/1994 |
| JP | 4167079 | A | 6/1992 |
| JP | H08502612 | A | 3/1996 |
| JP | H10-049504 | | 2/1998 |
| JP | 2003058519 | A | 2/2003 |
| JP | 2003256222 | A | 9/2003 |
| JP | 2006293743 | A | 10/2006 |
| JP | 5065050 | B2 | 10/2012 |
| WO | 9410628 | A1 | 5/1994 |
| WO | 0165357 | A1 | 9/2001 |
| WO | 2007074797 | A1 | 7/2007 |

OTHER PUBLICATIONS

WIPO Appln. No. PCT/JP2006/325831, Int'l. Search Report, Jun. 23, 2010, 3 pg.
EPO Appln. No. EP06843215, Extended Supplemental Search Report, Jun. 23, 2010, 2 pg.
U.S. Appl. No. 12/097,759, Non-Final Office Action, Feb. 5, 2010, 27 pg.
U.S. Appl. No. 12/097,759, Final Office Action, Sep. 17, 2010, 18 pg.
U.S. Appl. No. 12/097,759, Advisory Action, Jan. 21, 2011, 2 pg.
U.S. Appl. No. 12/097,759, Examiner's Answer to Appeal Brief, Feb. 25, 2011, 21 pg.
U.S. Appl. No. 12/097,759, Patent Board Decision, Jun. 2, 2014, 9 pg.
U.S. Appl. No. 12/097,759, Notice of Allowance, Aug. 14, 2014, 7 pg.

* cited by examiner

FIG. 5

| CLIENT ID | CONNECTION START TIME | CONNECTION TERMINATION TIME | DELEGATION LEVEL |
|---|---|---|---|
| 2 | 8:15 | 9:15 | 0 |
| 4 | 9:10 | 9:20 | 0 |
| ⋮ | ⋮ | ⋮ | ⋮ |
| 7 | 13:25 | 13:42 | 1 |
| 2 | 13:30 | 13:57 | 2 |
| 1 | 13:43 | 14:11 | 0* |
| ⋮ | ⋮ | ⋮ | ⋮ |
| 2 | 16:01 | 16:36 | 1 |
| ⋮ | ⋮ | ⋮ | ⋮ |

FIG. 6

| SERVER UTILIZATION \ DELEGABLE LEVEL | LEVEL 2 | LEVEL 1 | LEVEL 0 |
|---|---|---|---|
| EQUAL TO OR MORE THAN 15% | 1 | 2 | 5 |
| EQUAL TO OR MORE THAN 10% LESS THAN 15% | 3 | 4 | 8 |
| EQUAL TO OR MORE THAN 5% LESS THAN 10% | 6 | 7 | 11 |
| LESS THAN 5% | 9 | 10 | 12 |

LOAD DISTRIBUTION IN CLIENT SERVER SYSTEM

CROSS-REFERENCE TO RELATED APPLICATIONS

This application is a Continuation of U.S. application Ser. No. 12/097,759, filed on Sep. 15, 2008, which is a U.S. National Stage Patent Application of International Application Number PCT/JP2006/325831, filed Dec. 26, 2006, which is related to and claims priority to Japanese Patent Application Serial Number JP2005377421, filed Dec, 28, 2005, the entirety of which are incorporated herein by reference.

TECHNICAL FIELD

The present invention relates to load balancing in a client server system, and in particular, relates to load balancing in which, when a server is heavily loaded, processes in the server can be selectively delegated to a requesting client.

BACKGROUND ART

Client server systems are utilized in a variety of fields, ranging from large-scale systems in which the Internet is used to small-scale systems such as home LANs. Moreover, client server systems are actively used in business organizations. For example, in call center operations, a client server system that includes a voice server is used to record a history of dialogues with customers in a database. In this system, a dialogue with a customer is sent from a terminal (a client) for an operator to the voice server as voice data, the voice server converts the voice data to text data by voice recognition and sends the text data back to the client, and then the operator records the text data in the database.

In general, in the aforementioned client server systems, a load balancing technique is adopted so as to achieve a quick response to clients by improving the efficiency of processes in the systems. In general, load balancing is performed among servers. In load balancing among servers, a client server system is known in which a special unit for load balancing called a load balancer is provided between a plurality of servers and clients, and when a request has been sent from one of the clients, the load balancer selects an appropriate one of the servers and sends the request to the one of the servers (Patent Document 1).

Moreover, a system in which load balancing between a server and a client, other than load balancing among servers, is performed is known. For example, Patent Document 2 discloses a distributed processing system in which, when a connection request is received from a client, the CPU utilization of a server is checked, and when the CPU utilization is equal to or less than a predetermined value, a requested process is performed; and when the CPU utilization exceeds the predetermined value, an application program for performing the process is sent to the client, and the client performs the process. Moreover, Patent Document 3 discloses a distributed processing system in which a plurality of corresponding processing modules are provided in a server and a client, and the capabilities of the server and the client are compared to increase or decrease the number of processing modules to be performed in the server and the client in response to the result of the comparison. In this system, when the capability of the server is higher than that of the client, the number of processing modules to be performed in the server is increased, and when the capability of the client is higher than that of the server, the number of processing modules to be performed in the client is increased.

Patent Document 1: U.S. Pat. No. 6,779,017
Patent Document 2: U.S. Pat. No. 6,385,636
Patent Document 3: Japanese Patent Application Publication No. 2003-58519

DISCLOSURE OF INVENTION

Problems to be Solved by the Invention

In load balancing among servers disclosed in Patent Document 1, when the number of requests from clients increases more than expected, the waiting time of clients is extended. It is necessary to increase the number of servers to solve this problem, however, resulting in an increase in the cost. Moreover, it is difficult to apply this load balancing among servers to a system in which the number of servers is limited for some reason. In the method for load balancing in Patent Document 2, since an application program is sent from a server to a client every time loads are distributed, overhead in communications is increased. Moreover, when loads are distributed, since a client performs all processes, the method lacks flexibility. The method for load balancing in Patent Document 3 is more flexible than that in Patent Document 2, but is applied only to a case where a one-to-one relationship exists between a server and a client. Problems in a case where a plurality of clients are concurrently connected to a server are not solved. Moreover, since loads are distributed in response to the capabilities of a server and a client, loads are always put on the client.

Accordingly, it is an object of the present invention to provide a load balancing client server system, a server, a load balancing method, and a program for causing a computer to perform the load balancing method that, in a client server system that includes a server to which a plurality of clients can concurrently connect, can efficiently distribute loads between the server and the clients.

Means for Solving the Problems

In the present invention, the aforementioned object is achieved by causing a requesting client that sends a connection request for processing to selectively take over a process in a server in response to the status. Hereinafter, the takeover is called delegation.

In a first aspect of the present invention, a load balancing client server system is provided. The load balancing client server system includes a server, and a plurality of clients each of which can request a connection for processing to the server. Each of the clients includes communication means for sending status information that indicates status of that client, together with a connection request, to the server, and processing means capable of selectively performing processing in the server. The server includes communication means for receiving a connection request and status information from a requesting client, load monitoring means for monitoring load status of the server, and delegation means for determining, on the basis of the status information, a delegation level at which processing in the server is delegated to the requesting client in response to the connection request received by the communication means in the server, allowing the connection request from the requesting client when a server load after delegation does not exceed the maximum allowable load, and notifying the requesting client of the delegation level. Processing means in the requesting client performs processing according to the notified delegation level.

In a second aspect of the present invention, a server that can connect to a plurality of clients and performs processing upon receiving a connection request for the processing from a requesting client is provided. The server includes load monitoring means for monitoring load status of the server, communication means for receiving status information that indicates status of the requesting client, together with the connection request, from the requesting client, delegation means for determining, on the basis of the status information, a delegation level at which processing in the server is delegated to the requesting client in response to the connection request received by the communication means and allowing the connection request from the requesting client when a server load after delegation does not exceed the maximum allowable load, and notifying means for, when the delegation means allows the connection request, notifying the requesting client of the delegation level so as to cause the requesting client to perform processing according to the delegation level.

In a third aspect of the present invention, a load balancing client server system is provided. The load balancing client server system includes a plurality of servers, a plurality of clients, and a load balancer that, upon receiving a connection request for processing from each of the clients, selects a first server from the plurality of servers and causes the first server to perform the processing. Each of the clients includes communication means for sending status information that indicates status of that client, together with a connection request, to the load balancer, and processing means capable of selectively performing processing in a server. The load balancer includes communication means for receiving a connection request and status information from a requesting client, load monitoring means for monitoring load statuses of the servers, and delegation means for determining, on the basis of the status information, a delegation level at which the processing in the selected first server is delegated to the requesting client in response to the connection request received by the communication means in the load balancer allowing the connection request from the requesting client when a server load after delegation does not exceed the maximum allowable load, and notifying the requesting client of the delegation level. Processing means in the requesting client performs processing according to the notified delegation level.

In a fourth aspect of the present invention, a load balancing method for, in a client server system that includes a server and a plurality of clients each of which can request a connection for processing to the server, distributing loads between the server and the clients is provided. The method includes a step in which the server monitors load status of the server, a step in which a requesting client sends status information that indicates status of the requesting client, together with a connection request, to the server, a step in which the server determines, on the basis of the status information, a delegation level at which processing in the server is delegated to the requesting client in response to the connection request and allows the connection request from the requesting client when a server load after delegation does not exceed the maximum allowable load, a step in which the server notifies the requesting client of the delegation level, and a step in which the requesting client performs processing according to the delegation level.

In a fifth aspect of the present invention, a load balancing method for, in a server that can connect to a plurality of clients and performs processing upon receiving a connection request for the processing from a requesting client, distributing loads by selectively delegating processing to be performed by the server to the requesting client is provided. The method includes a step of monitoring load status of the server, a step of receiving status information that indicates status of the requesting client, together with a connection request, from the requesting client, a step of determining, on the basis of the status information, a delegation level at which processing in the server is delegated to the requesting client in response to the connection request and allowing the connection request from the requesting client when a server load after delegation does not exceed the maximum allowable load, and a step of notifying the requesting client of the delegation level so as to cause the requesting client to perform processing according to the delegation level.

In a sixth aspect of the present invention, a program for causing a computer in a server to perform the load balancing method according to the aforementioned fourth aspect is provided.

As described above, in the present invention, when a server is heavily loaded, on condition that the server load does not exceed the maximum allowable load, processing in the server is selectively delegated to a requesting client in response to the status of the requesting client. Thus, load balancing that is more efficient and dynamic than ever can be performed. Moreover, the number of clients that can concurrently connect to a server is more than that in a case where processing is performed only in the server.

Best Mode for Carrying out the Invention

The best modes for carrying out the present invention will now be described with reference to the attached drawings. The same reference numerals denote the same components throughout the drawings, respectively.

FIG. 1 shows the outline of a client server system 10 to which the present invention can be applied. In the system 10, a plurality of clients 16 are connected to a server 14 via a network 12. The network 12 may include any network, such as a private network (for example, an intranet in a company) in which a local area network (LAN) is used, or a public network including the Internet.

The client server system 10 can be used in, for example, an operation to keep a history of dialogues with customers in call center operations. FIG. 2 shows a general flow of this operation. In FIG. 2, the client 16 is a terminal for an operator, and the server 14 is a voice server. The clients 16 records a dialogue between an operator and a customer and sends the dialogue to the server 14 as voice data. The server 14 converts the voice data to text data by performing voice recognition that includes three processing stages 1 to 3 and sends the text data back to the client 16. The client 16 keeps a history of dialogues by recording the received text data in a database (not shown). In this case, the processing stages 1 to 3 correspond to, for example, a cepstrum analysis process, a feature extraction process, and a matching process, respectively, and are sequentially performed. In general, all the processing stages are performed in the server 14. In the present invention, when the server 14 is heavily loaded, processing in the server 14 can be performed in the client 16 by delegating one or more processing stages that are selected in response to the status of the client 16 to the client 16.

FIG. 3 shows the components of the client 16 and the server 14 that enable the aforementioned delegation process. The client 16 includes a communication unit 20 that sends status information indicating the status of the client 16, together with a connection request, to the server 14 and a processing unit 22 that selectively performs processing in the server 14. The status information includes, for example, hardware status, such as the type of a processor provided in the client 16 and the utilization of a memory.

The server 14 includes a communication unit 24 that receives a connection request and status information from the requesting client 16, a load monitoring unit 26 that monitors the load status of the server 14, and a delegation unit 28. In response to the connection request received by the communication unit 24, the delegation unit 28 determines a delegation level for delegating processing in the server 14 to the requesting client 16 on the basis of the status information of the requesting client 16. When the load on the server after the delegation does not exceed the maximum allowable load, the delegation unit 28 allows the connection request from the requesting client 16 and notifies the requesting client 16 of the determined delegation level. The server 14 further includes a client monitoring unit 30 that monitors server usage status of each client.

The client monitoring unit 30 includes a monitoring unit 32 that monitors a server usage rate of each client and a history of delegation of each client, a classification unit 34 that classifies the clients into a plurality of groups in response to the server usage rate and the history of delegation and determines a priority for each of the groups, and a prediction unit 36 that, for each of the groups, predicts time at which the next connection request occurs by calculating an interval between connection requests from clients that belong to that group.

The load monitoring unit 26, the delegation unit 28, and the client monitoring unit 30, described above, constitute a processing unit of the server 14. Thus, the basic components of the server 14 may be the same as those of the client 16.

Before the details of a delegation operation by the server 14 are described, a delegation level will now be described with reference to the operation shown in FIG. 2. The processing stages 1, 2, and 3 respectively correspond to the cepstrum analysis process, the feature extraction process, and the matching process, as described above. Since external resources, such as an acoustic model, a language model, and a dictionary, are used in the last matching process, the matching process is not suitable for being delegated to a client. Thus, in the present embodiment, the following delegation levels are set:

Delegation level 0: no delegation to a client
Delegation level 1: delegating the processing stage 1 to a client
Delegation level 2: delegating the processing stages 1 and 2 to a client As is apparent from this, a delegation level represents up to what processing stage, starting from the first processing stage, a client performs. Program modules for performing the processing stages 1 and 2 are preinstalled in each of the clients 16 so as to enable such delegation.

FIG. 4 shows an example of the flow of delegation processing performed by the server 14. This flow is started when the communication unit 24 in the server 14 has received a connection request from one of the clients 16 (step S1). When the connection request has been received, the load monitoring unit calculates the load on the server 14 according to the following equation (step S2):

$$WL = L0*X + L1*Y + L2*Z.$$

In the foregoing equation, L0, L1, and L2 respectively denote the numbers of occurrences of the delegation levels 0, 1, and 2 that the delegation unit 28 has determined and at which levels related processing is being performed in requesting clients. In the case of the delegation level 0, since no processing is delegated to a client, the number of occurrences of the delegation level 0 represents the number of currently connecting clients without delegation. Parameters X, Y, and Z are expressed by the following equations:

$$X = (1/MaxL0)*100,$$

$$Y = X*(1-R1),$$

$$Z = X*(1-R2).$$

In the foregoing equations, MaxL0, R1, and R2 respectively denote the maximum number of clients that can establish connections without delegation, the rate of decrease of the load on the server 14 in a case where processing is delegated to a client at the delegation level 1, and the rate of decrease of the load on the server 14 in a case where processing is delegated to a client at the delegation level 2. For example, when MaxL0=10, R1=75%, and R2=87.5%, the server load WL is expressed as follows:

$$WL = 10L0 + 2.5L1 + 1.25L2.$$

The load monitoring unit 26 indicates to the delegation unit 28 whether the calculated load exceeds a standard load (step S3). The standard load is a load referenced by the server 14 to determine whether to delegate part of the processing to the requesting client 16. For example, the standard load may be set to 80% of the maximum capability of the server 14. When the server load does not exceed the standard load, the delegation unit 28 allows the requesting client 16 to establish a connection without delegation (step S4), and then the process proceeds to step S14.

When the server load exceeds the standard load, the delegation unit 28 determines a delegable level for the requesting client 16 on the basis of status information received from the requesting client 16, together with the connection request. For example, the delegation unit 28 may determine the level in the following manner on the basis of the status of the processor and memory of the requesting client 16:

Level 0=the operating frequency of the processor is less than 300 MHz, or the memory utilization exceeds 80%
Level 1=the operating frequency of the processor is less than 450 MHz
Level 2=other than those described above Needless to say, this is just an example, and other factors can be incorporated, or the values of the operating frequencies and the memory utilization can be changed. In general, the higher the performance of the processor, the higher the delegation level can be.

Then, the load monitoring unit 26 predicts the server load in response to the determined delegable level (step S6) and indicates to the delegation unit 28 whether the predicted server load exceeds the maximum allowable load (step S7). In the foregoing equation, in the case of delegation at the level 0, the load is increased by 10, in the case of delegation at the level 1, the load is increased by 2.5, and in the case of delegation at the level 2, the load is increased by 1.25. The maximum allowable load is set to, for example, 90% of the maximum capability of the server 14. In a case where the predicted server load exceeds the maximum allowable load, in step S8, the delegation unit 28 rejects a connection and sends a notification of rejection to the requesting client 16 via the communication unit 24.

In a case where the predicted server load does not exceed the maximum allowable load, when a connection request from another client having a higher priority than the requesting client is forthcoming soon, that connection request should be prioritized. Thus, the client monitoring unit 30 determines predicted time till the next connection request and a predicted delegation level (step S9). The details of step S9 will be described later.

When the predicted time till the next connection request from the client having a higher priority is short, the process proceeds from step S10 to step S11, and the load monitoring unit 26 predicts the server load reached upon the next connection request depending on the predicted delegation level. The prediction here is the same as that in step S6. However, in this case, a load for processing the request from the client having a higher priority is added. When the predicted server load exceeds the maximum allowable load, a connection from the requesting client 16 is rejected in step S8.

When the server load does not exceed the maximum allowable load or when the predicted time till the next connection request is long, the process proceeds to step S13 where a connection from the requesting client 16 is allowed, and the communication unit 24 notifies the requesting client 16 of the delegation level determined in step S5.

Then, the monitoring unit 32 in the client monitoring unit 30 records the connection start time of a group (the details of which will be described later) to which the requesting client 16 belongs (step S14). When the connection of the requesting client 16 is terminated (step S15), the monitoring unit 32 records an identifier (ID), connection start time, connection termination time, and delegation level of the requesting client 16 as a history. The server 14 performs the flow in FIG. 4 upon receiving a connection request, and the monitoring unit 32 records a connection history of an allowed requesting client every time. FIG. 5 shows an example of a connection history. This history is used in the classification unit 34 to classify clients into groups. The delegation level 0 in the connection history is automatically determined in step S4 in FIG. 4 or determined in step S5 in FIG. 4 on the basis of status information. However, only the latter delegation level 0 is considered in the group classification by the classification unit 34, as described below. Thus, when the connection history is recorded, a flag is set for the delegation level 0 determined in step S5. An asterisk "*" in FIG. 5 indicates such flagging.

The group classification by the classification unit 34 will now be described. Here, for the sake of illustration, it is assumed that the group classification is performed after operations every day. Alternatively, the group classification may be performed in a different cycle, for example, every third day or every week. The classification unit 34 classifies clients into a plurality of groups in response to the server utilization or usage rate of each client and the history of delegation of each client, as described above. Thus, the monitoring unit 32 calculates connection time from the connection start time and connection termination time of each client, referring to the connection history in FIG. 5 using the client ID, and calculates the ratio of the total connection time to operation hours (for example, eight hours) in a day as the server utilization. Moreover, the monitoring unit 32 determines a level that can probably be delegated to each client from the history of delegation levels.

The determination of the server utilization and the delegable level will now be described with reference to the connection history in FIG. 5. For example, a client with an ID of 2 has been allowed to establish a connection three times, and the total connection time is 102 minutes. In this case, the history of delegation levels is 0 (that is automatically determined in step S4 in FIG. 4), 2, and 1. Assuming that operation hours in a day are eight hours (480 minutes), the server utilization of the client with an ID of 2 is 102/480, i.e., 21.25%. The delegable level can be determined in, for example, the following manner:

1. When the number of occurrences of the delegation level 2 in the connection history is equal to or more than 95% of the number of times a connection has been made in a case where the standard load is exceeded (in the case of a branch for "YES" in step S3), the level 2 is set as a delegable level.

2. When the sum of the number of occurrences of the delegation level 2 and the number of occurrences of the delegation level 1 in the connection history is equal to or more than 95% of the number of times a connection has been made in a case where the standard load is exceeded, the level 1 is set as a delegable level.

3. The level 0 is set for cases other than those described above.

The number of times a connection has been made in items 1 and 2 represents the sum of occurrences of the delegation level 0*  (that is determined in step S5 in FIG. 4), the delegation level 1, and the delegation level 2 in the connection history in FIG. 5. The client with an ID of 2 corresponds to the case in item 2, the level 1 is set as a delegable level. This does not mean that the delegation level 1 is actually assigned but means that a predicted delegation level in step S9 is the level 1 when the client with an ID of 2 requests a connection next time.

The classification unit 34 classifies clients into groups on the basis of server utilizations and delegable levels from the monitoring unit 32, as shown in FIG. 6. Numbers 1 to 12 in FIG. 6 denote the priorities of corresponding groups. As is apparent from this, the higher the server utilization and the delegable level, the higher the priority assigned by the classification unit 34. In an example in FIG. 6, weight attached to the server utilization is higher than that attached to the delegable level. This relationship may be reversed. The classification unit 34 performs the group classification shown in FIG. 6 outside operation hours at regular intervals (for example, every day, every third day, or every week). When the capability of the server 14 is high, the group classification may be performed in real time during operation hours. However, in that case, the group classification needs to be performed again every time a connection is made, which is not preferable because the server 14 is heavily loaded.

The prediction unit 36 predicts time when any client that belongs to each group sends a connection request next time from data of the connection start time of each group recorded by the monitoring unit 32 in step S14. Then, the prediction unit 36 indicates the result of the prediction, together with the priority and delegable level of each group, to the delegation unit 28. The priority and delegable level can be obtained from the classification unit. The prediction unit 36 calculates an average interval between connection requests from, for example, data of the connection start time of each group and then predicts time when the next connection request occurs for each group by subtracting time that has elapsed since the last connection start time of each group from the average interval between connection requests.

The delegation unit 28 determines whether to allow a connection from the requesting client 16 on the basis of these items of data, as described above. In this case, only items of data of groups with a priority higher than that of the requesting client 16 are considered in steps S10 to S12. Thus, the delegation unit 28 may indicate the ID of the requesting client 16 to the client monitoring unit 30 in advance so that the prediction unit 36 sends the delegation unit 28 only items of data of groups with a priority higher than that of the requesting client 16. In this case, the prediction unit 36 need not send information on priorities to the delegation unit 28.

When the delegation process described above is completed, the requesting client 16 selectively performs processing in the server 14 in response to the delegation level notified from the server 14. Specifically, when the delegation level is 0, the processing unit 22 performs only recording, as shown in FIG. 2. When the delegation level is 1, the processing unit 22 performs the processing stage 1 in the server 14 after recording. When the delegation level is 2, the processing unit 22 also performs the processing stage 2 after the processing stage 1. When the processing is completed, the requesting client 16 sends the result of the processing to the server 14. Then, the server 14 performs a remaining processing stage or stages on the received result of the processing and sends the result of the processing, i.e., text data, back to the requesting client.

The server 14, which is a main component of the present invention, may be implemented as, for example, a data processing system 100 shown in FIG. 7. The data processing system 100 may be a symmetric multiprocessor (SMP) system that includes a plurality of processors 102 and 104 connected to a system bus 106. Alternatively, a uniprocessor system may be used. Moreover, a memory controller/cache 108 that functions as an interface to a local memory 109 is connected to the system bus 106. An I/O bridge 110 is connected to the system bus 106 and functions as an interface to an I/O bus 112. The memory controller/cache 108 and the I/O bus bridge 110 may be integrated, as shown in the drawing.

A PCI bus bridge 114 connected to the I/O bus 112 functions as an interface to a PCI local bus 116. A modem 118 and a network adapter 120 are connected to the PCI local bus 116 to communicate with the clients 16. Moreover, a graphics adapter 122 and a hard disk 124 are connected to the I/O bus 112. Although not shown in FIG. 7 for the sake of simplification, a display device is connected to the graphics adapter 122, and input devices, such as a mouse and a keyboard, and output devices, such as a printer, may be connected to the I/O bus 112.

The communication unit 24 in the server 14 shown in FIG. 3 may be implemented as, for example, the modem 118 or the network adapter in the data processing system 100, and the load monitoring unit 26, the delegation unit 28, and the client monitoring unit 30 may be implemented as functions of a program executed in the processors 102 and 104. Needless to say, these components may be implemented as dedicated hardware or a combination of hardware and software. In the system shown in FIG. 7, the program executed in the processors 102 and 104 is recorded on the hard disk 124. However, needless to say, any recording medium other than the hard disk 124 may be used.

Each of the clients 16 may include similar components. However, because each of the clients 16 need not achieve high performance like the server 14, one processor is enough.

While one server is provided in the embodiment described above, the present invention may be applied to a client server system that includes two or more servers. FIG. 8 shows this example. A client server system 200 according to an alternative embodiment includes a plurality of the clients 16 connected to the network 12 and a plurality of servers 204 connected to the network 12 via a load balancer 202 as disclosed in Patent Document 1. The network 12 and the clients 16 may be the same as those in FIG. 1. However, unlike the server 14 shown in FIGS. 1 and 3, the servers 204 are ordinary servers, and all the components 26 to 36 for the delegation processing are moved to the load balancer 202.

The load balancer 202 monitors the load status of each of the servers 204 and normally performs load balancing among servers. A known method as in Patent Document 1 can be used for this load balancing among servers. When loads on all the servers 204 exceed the standard load, the load balancer 202 performs the aforementioned delegation processing. In the example in FIG. 4, when the load balancer 202 has received a connection request from one client (step S1), the load balancer 202 calculates a load on each of the servers 204 (step S2). In this case, when at least one server in which the server load does not exceed the standard load exists, the load balancer 202 indicates to a server a load on which is smallest, out of such servers, to process the connection request and allows the requesting client to establish a connection without delegation. On the other hand, when loads on all the servers 204 exceed the standard load, the load balancer 202 selects a server a load on which is smallest from the servers 204 and performs step S5 and the following steps in FIG. 4. The operation of step S5 and the following steps may be the same as that described above. Thus, the detailed description is omitted.

While the preferred embodiments of the present invention have been described, the present invention is not limited to such embodiments, and various modifications and changes can be made. For example, the number of processing stages in a server is not limited to three and can be increased or decreased depending on the application. The same applies to the number of delegation levels. Various values shown in the embodiments can be properly changed. Moreover, the present invention is not limited to voice recognition and can be applied to an application that causes a high server load, such as image recognition.

BRIEF DESCRIPTION OF THE DRAWINGS

FIG. 5 shows an example of data recorded by a client monitoring unit in the client server system in FIG. 3.

FIG. 6 shows a table in which a classification unit in the client monitoring unit classifies a plurality of clients on the basis of server utilizations and delegable levels.

REFERENCE NUMERALS

Figure 1:
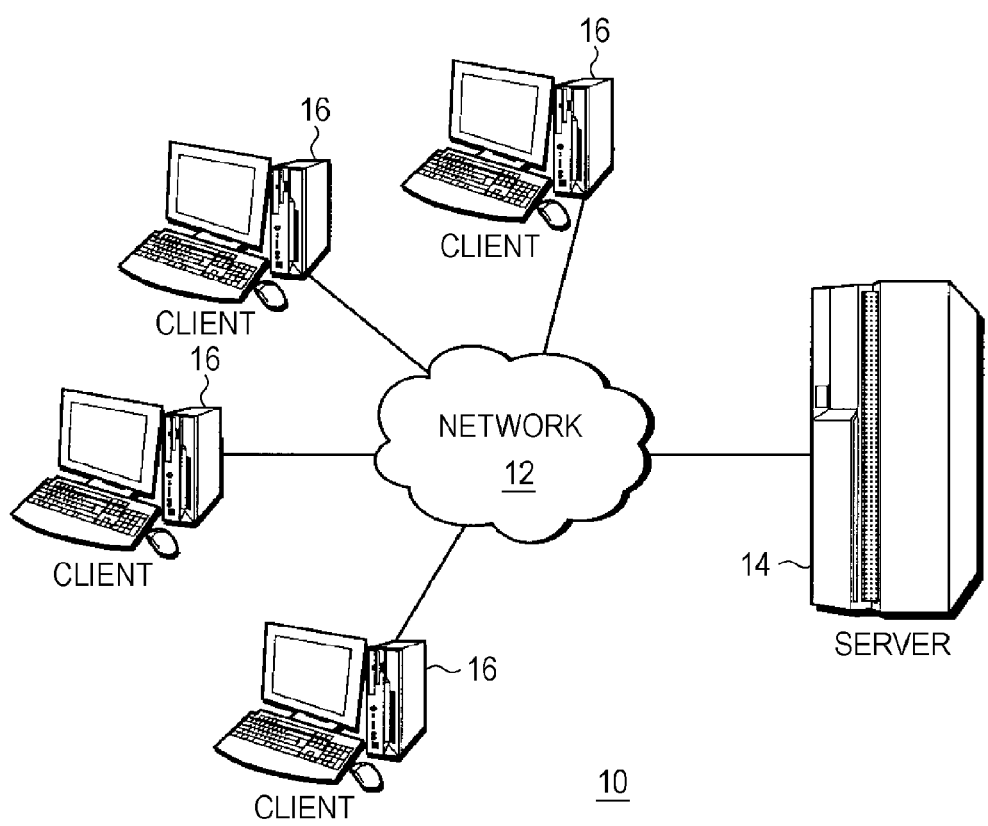
FIG. 1 shows the outline of a client server system in which the present invention can be carried out.
Figure 2:
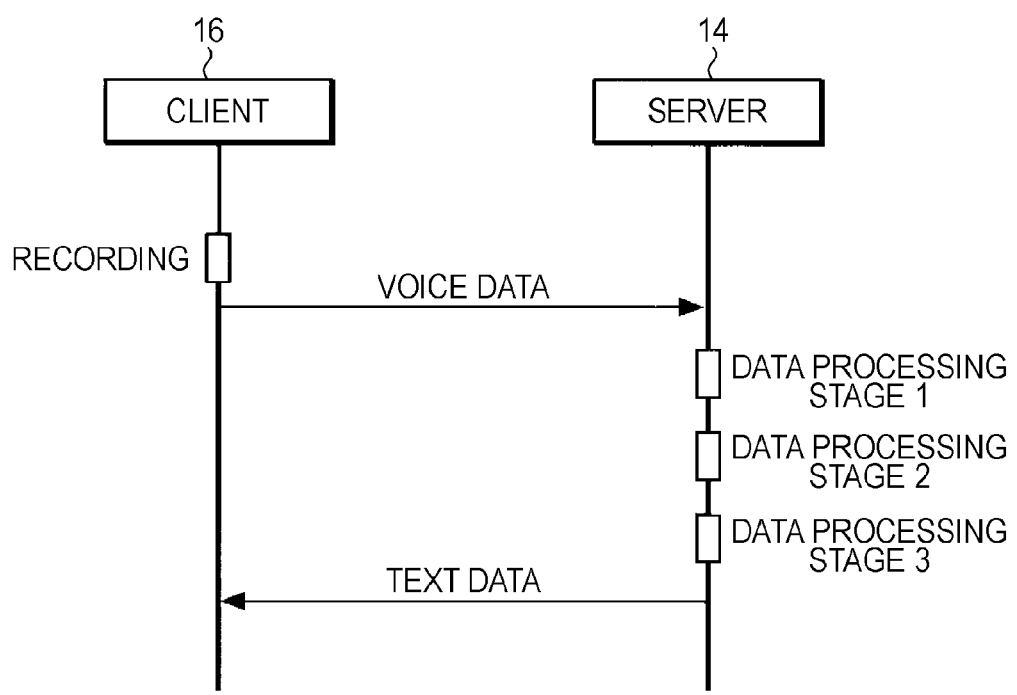
FIG. 2 shows an exemplary flow of processing in a client and a server in call center operations.
Figure 3:
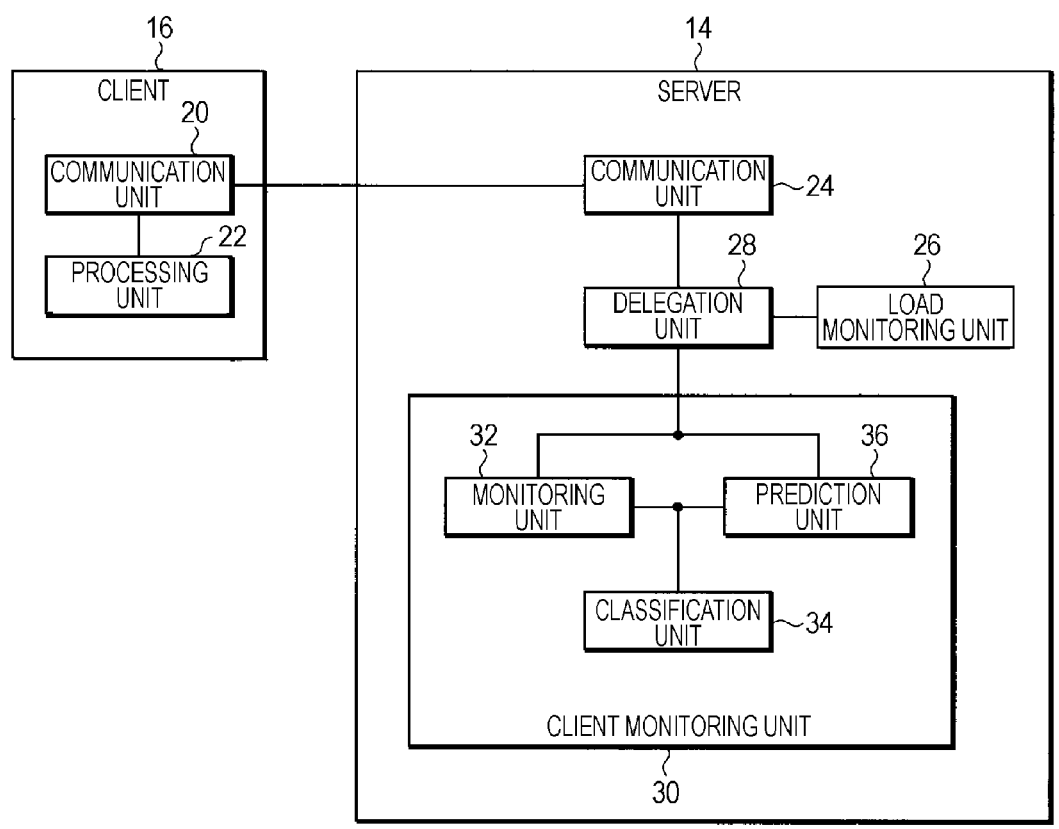
FIG. 3 shows exemplary components of the client server system according to the present invention.
Figure 4:
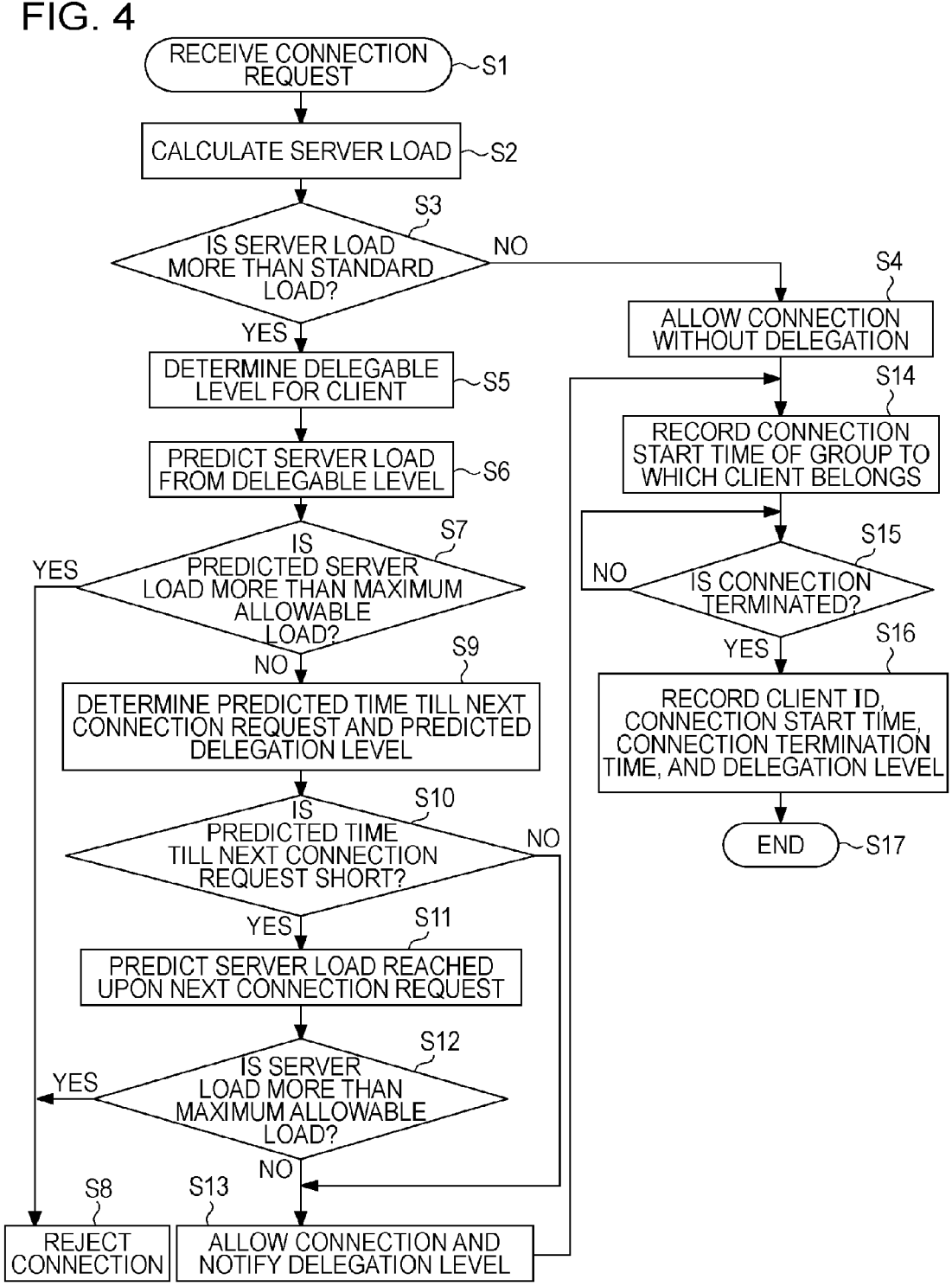
FIG. 4 shows an exemplary flow of delegation processing in the client server system in FIG. 3.
Figure 7:
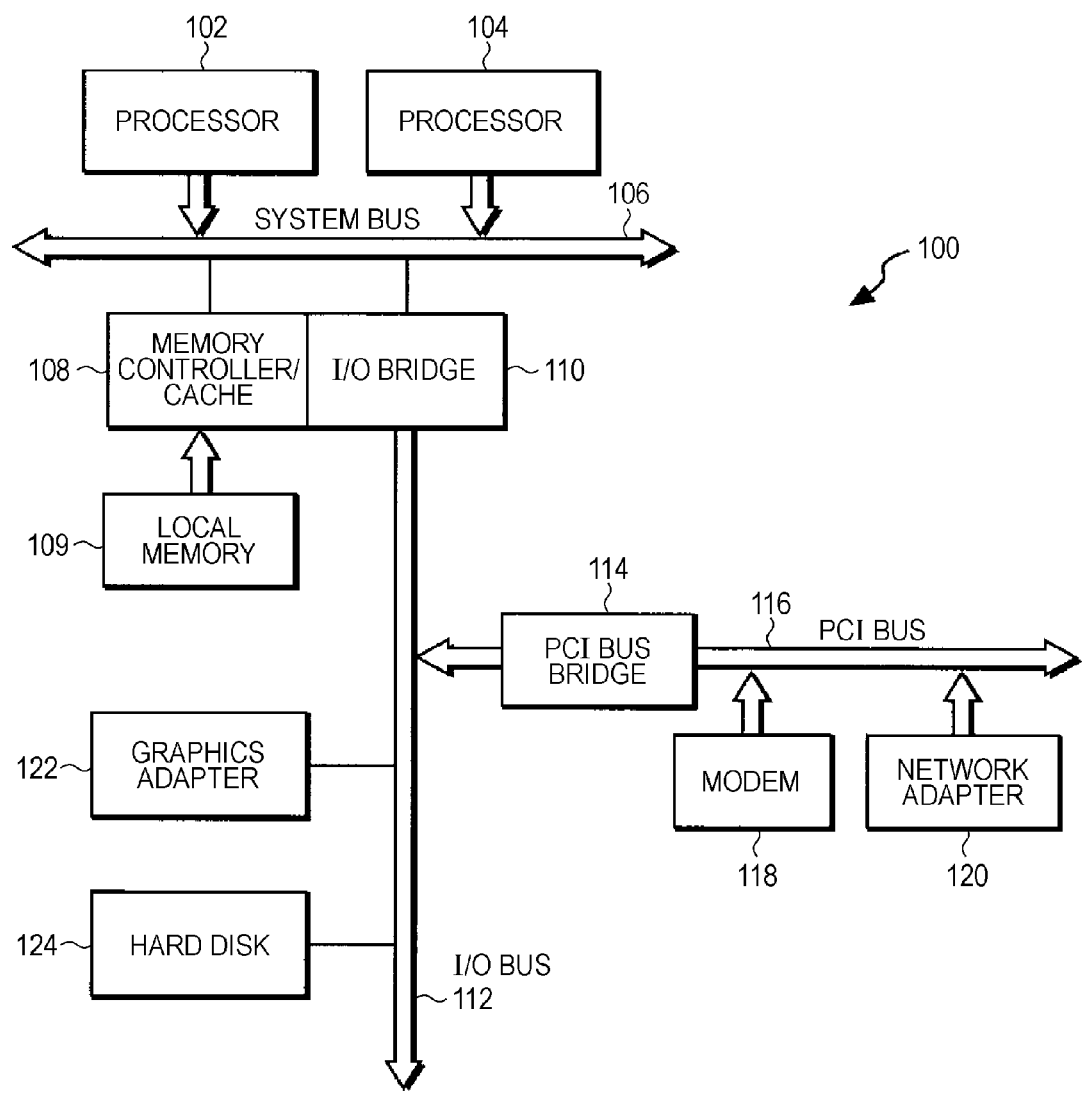
FIG. 7 shows exemplary components of a data processing system that can be used as a server.
Figure 8:
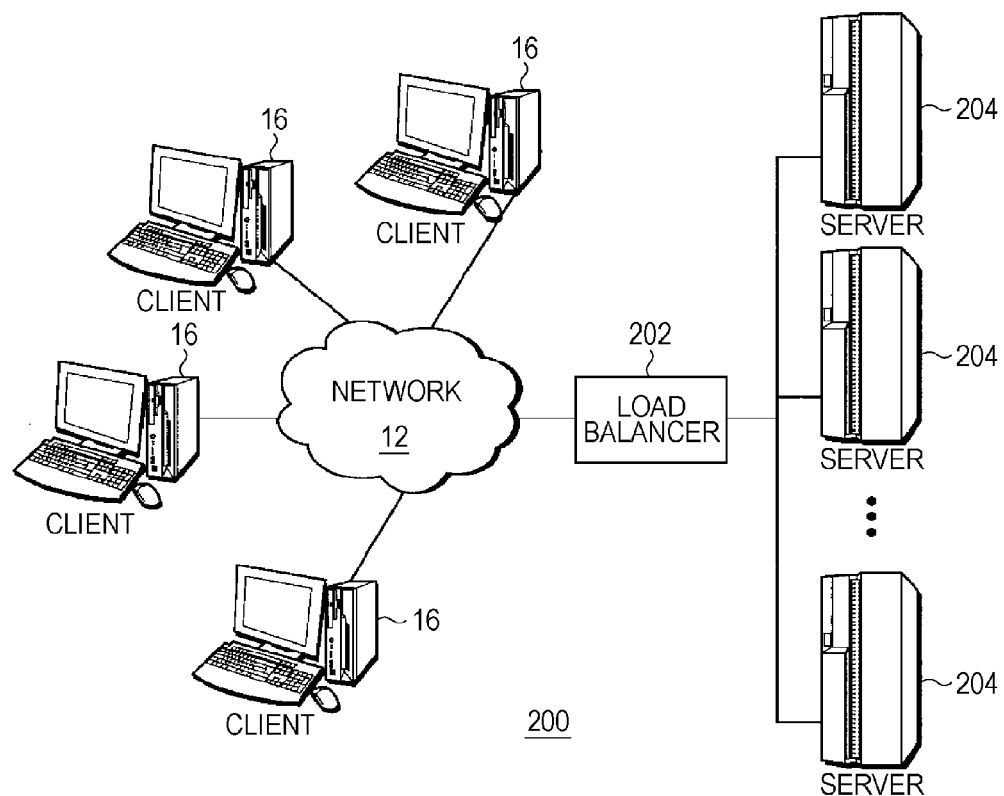
FIG. 8 shows an alternative embodiment of the present invention that includes a plurality of servers.

12 Network
14 Server
16 Client
20 Communication unit
22 Processing unit
24 Communication unit
26 Load monitoring unit 28 Delegation unit
30 Client monitoring unit
32 Monitoring unit
34 Classification unit
36 Prediction unit

The invention claimed is:

1. A load balancing method, comprising:
forwarding, by a requesting client and to a server, a connection request together with status information of the requesting client;
receiving, by the requesting client and from the server, a first indication of a delegation level indicating that no operation associated with the connection request is to be performed by the requesting client;
receiving, by the requesting client and from the server, a second indication of a delegation level indicating to the requesting client to perform processing of a specified operation associated with the connection request based upon a load status of the server exceeding a predetermined allowable load, wherein
the delegation levels characterize a capability of the requesting client to perform at least one operation associated with the connection request and otherwise performed by the server and are determined, by the server, using the status information.

2. The method of claim 1, wherein
the load status is a predicted load status, and
the predicted load status accounts for the specified operation being performed by the requesting client.

3. The method of claim 1, further comprising:
performing, by the requesting client and in response to the notification, the at least one operation.

4. The method of claim 1, wherein
the delegation levels are based upon the requesting client being classified into one of a plurality of groups of clients.

5. The method of claim 1, wherein
the second indication of the delegation level is selected from one of two delegation levels that respectively indicating two different amounts of processing stages to be performed by the requesting client.

6. A client hardware system, comprising:
at least one hardware processor, wherein the at least one hardware processor is configured to initiate and/or perform:
forwarding, to a server, a connection request together with status information of the client hardware system;
receiving, by the client hardware system and from the server, a first indication of a delegation level indicating that no operation associated with the connection request is to be performed by the client hardware system;
receiving, from the server, a second indication of a delegation level indicating to the requesting client to perform processing of a specified operation associated with the connection request based upon a load status of the server exceeding a predetermined allowable load, wherein
the delegation levels characterize a capability of the client hardware system to perform at least one operation associated with the connection request and otherwise performed by the server and are determined, by the server, using the status information.

7. The system of claim 6, wherein
the load status is a predicted load status, and
the predicted load status accounts for the specified operation being performed by the client hardware system.

8. The system of claim 6, wherein the at least one hardware processor is further configured to initiate and/or perform:
performing, in response to the notification, the at least one operation.

9. The system of claim 6, wherein
the delegation levels are based upon the requesting client being classified into one of a plurality of groups of clients.

10. The system of claim 6, wherein
the second indication of the delegation level is selected from one of two delegation levels that respectively indicating two different amounts of processing stages to be performed by the requesting client.

11. A computer program product, comprising:
a computer usable storage medium having stored therein computer usable program code,
the computer usable program code, when executed by a requesting client causes the requesting client to perform:
forwarding, by the requesting client and to a server, status information of the requesting client;
receiving, by the requesting client and from the server, a first indication of a delegation level indicating that no operation associated with the connection request is to be performed by the requesting client;
receiving, by the requesting client and from the server, a second indication of a delegation level indicating to the requesting client to perform processing of a specified operation associated with the connection request based upon a load status of the server exceeding a predetermined allowable load, wherein
the delegation levels characterize a capability of the requesting client to perform at least one operation associated with the connection request and otherwise performed by the server and are determined, by the server, using the status information.

12. The computer program product of claim 11, wherein
the load status is a predicted load status, and
the predicted load status accounts for the specified operation being performed by the requesting client.

13. The computer program product of claim 11, wherein the computer usable program code further causes the requesting client to perform:
performing, by the requesting client and in response to the notification, the at least one operation.

14. The computer program product of claim 11, wherein
the delegation levels are based upon the requesting client being classified into one of a plurality of groups of clients.

15. The computer program product of claim 11, wherein
the second indication of the delegation level is selected from one of two delegation levels that respectively indicating two different amounts of processing stages to be performed by the requesting client.

* * * * *